INVENTOR.
HERMAN R. GEUL
BY Bair, Freeman
& Molinare
ATTORNEYS

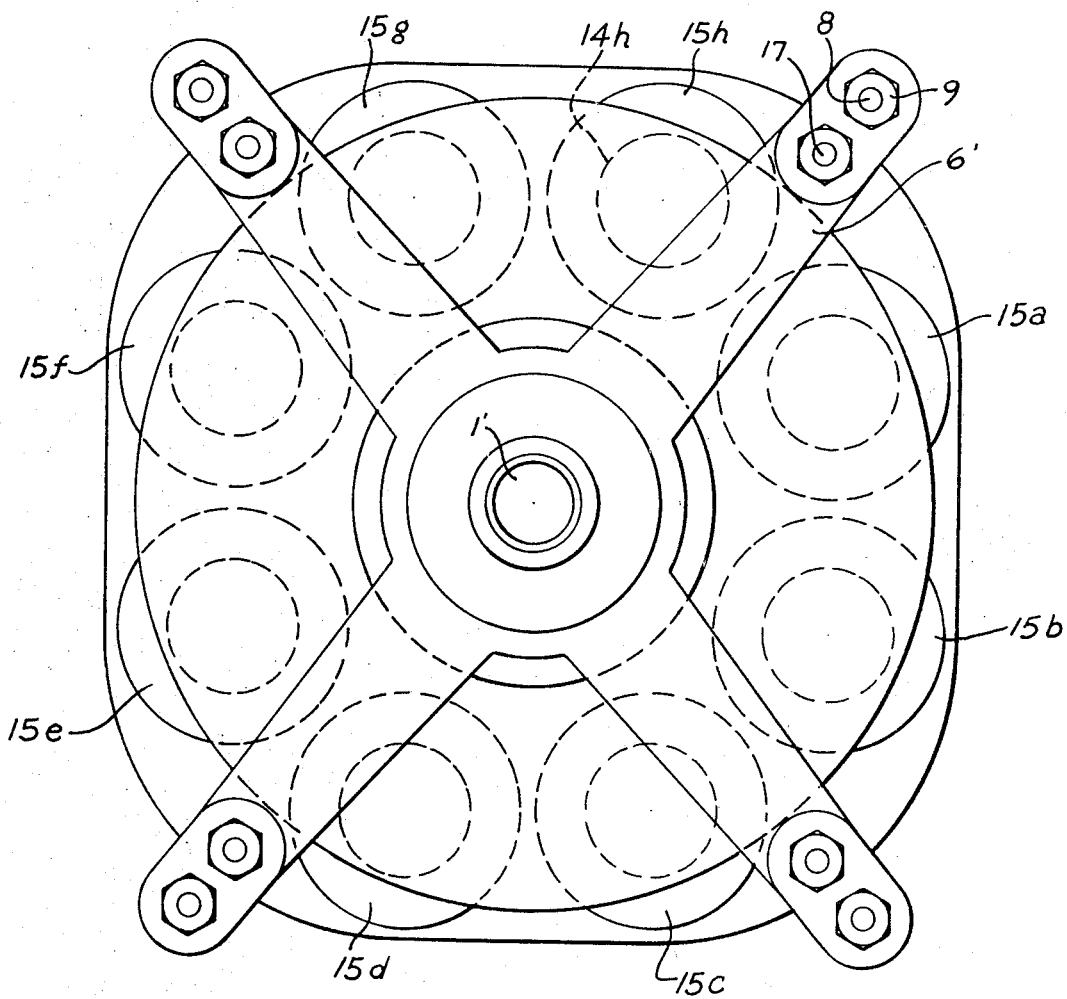

United States Patent Office 3,522,461
Patented Aug. 4, 1970

3,522,461
EDDY CURRENT BRAKE
Herman R. Geul, Leiden, Netherlands (% Sun Electric (Nederland) N.V., Ariana Nozemanstraat 8, Amsterdam, Netherlands)
Filed Oct. 2, 1968, Ser. No. 764,555
Claims priority, application Netherlands, Oct. 6, 1967, 6713597
Int. Cl. H02k 49/04
U.S. Cl. 310—93　　　　　　　　　　　　　　3 Claims

ABSTRACT OF THE DISCLOSURE

An improved eddy current brake for a roller testing stand comprising a single stator system formed of a number of poles, preferably arranged in a circular array, and further comprising a plurality of rotor systems, with at least one rotor system located on each side of the stator system such that the magnetic flux generated at the stator poles will be equal in the rotors and therefore, the braking effect on the rotors also will be approximately equal, even at different speeds of rotation of the rotors, each of said rotors being fastened to a shaft, which shafts are supported by bearings in separate housings that are rotatably supported in a cruciform yoke that also carries the stator system.

---

Figure 1:
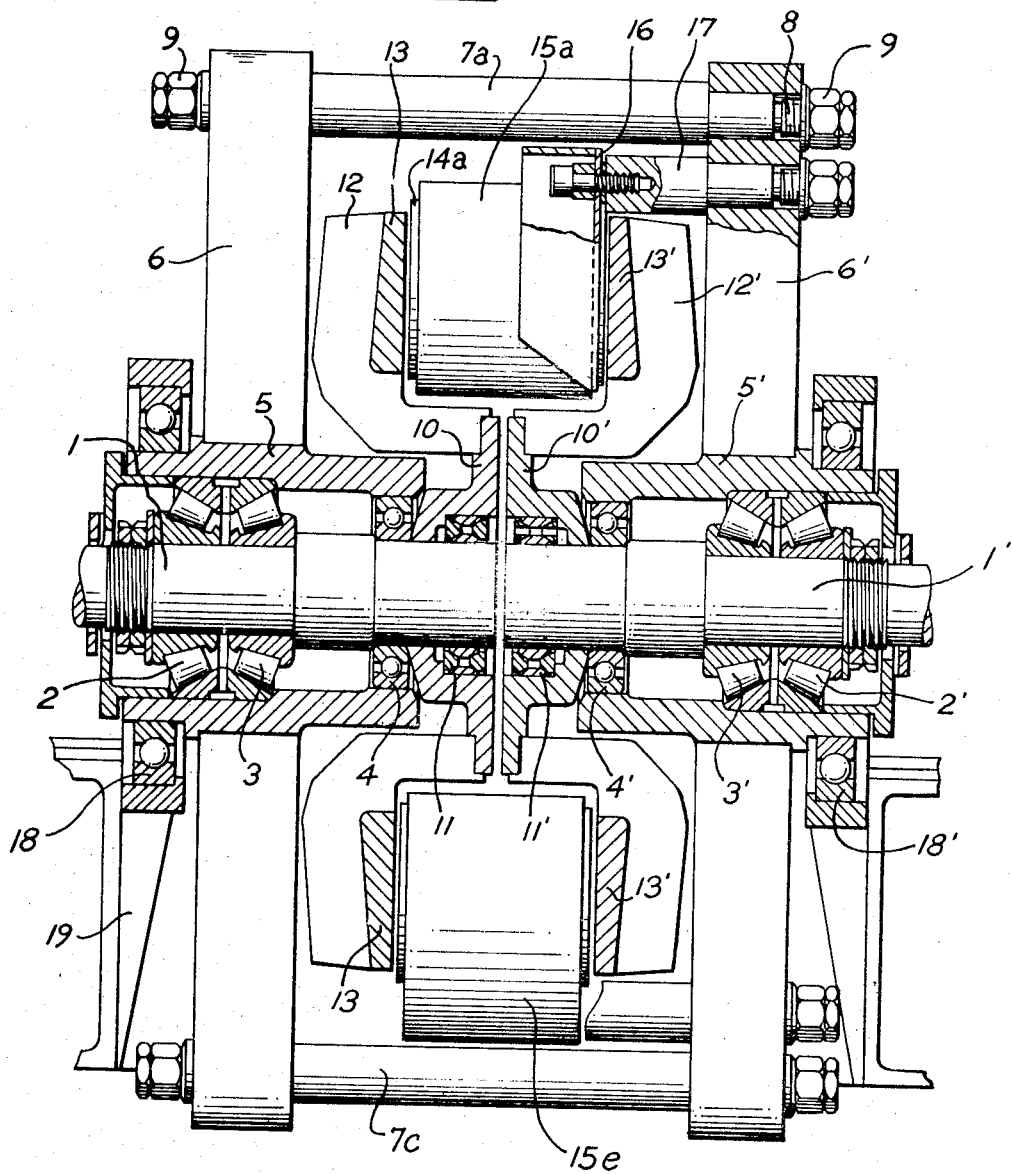

The invention relates to an eddy current brake, particularly for measuring purposes, which in a preferred embodiment comprises a single stator system formed of a number of stator poles, each carrying a coil and advantageously arranged in a circular configuration and cooperating with two rotor discs, which are each coupled to a shaft and respectively positioned on opposite sides of the stator poles, said shafts being supported by bearings for taking up axially and radially directed forces.

Eddy current brakes generally are known in the art, as shown for example by the French patent specification 1,267,191. This known eddy current brake is intended to be used in motor vehicles, for which purpose the stator system is fixed to the frame or the rear axle of the vehicle.

The improved eddy current brake of the present invention is particularly intended to be used for measuring purposes, e.g. in roller testing stands. For this purpose the stator system must be able to rotate over a certain angle; the angle of displacement, against the action of spring, is a measure of the power dissipated by the eddy current brake.

However, those skilled in the art understand that in roller testing stands the free space, available between the rollers, in axial direction as well as in radial direction, is very restricted as the distance between the rollers must be such that it is possible to test automobiles with a small track-width, while as a result of the very small ground clearance of some cars combined with the fact that the automobile rests with its wheels between two rollers, the brake can have only a very small diameter. An eddy current brake, used in a roller testing stand, must therefore be constructed very compactly and in a space-saving manner so that in a given free space a brake which can dissipate as great a power as possible can be accommodated.

Furthermore, the construction of an eddy current brake must take into account the fact that during operation of the brake very great axial forces, directed against each other, act upon the rotors and their shafts, which forces must be taken up by suitable bearings. During operation, each of the shafts is subjected to an alternating tilting couple as a result of the fact that the air gap, in practice, is never constant along the entire circumference of the rotor while other factors also contribute to this phenomenon. Particularly, in modern high-speed roller testing stands, in which the rotor discs rotate at high speeds, the shaft bearings must be of a very high quality and the bearings must be placed as far from each other as possible on each shaft.

The known eddy current brakes of the prior art are characterized by constructions which render them very badly suited for use in roller testing stands. The conventional use of a single, essentially cylindrical housing for all of the axial bearings, positioned at the center of the stator system, and at each end of which are placed the rotor discs, has the result that this housing must be fixed to the outside by means of a carrier disc perpendicular to the shafts. When it is desired that the stator system of such an eddy current brake be rotatable over a certain angle, as is necessary for use in roller testing stands, this means that either two bearings of a very great diameter must be provided around the stator system with the result that the whole structure has an undesirably large diameter, or that starting from the circumference of the carrier disc, a mechanical connection must be provided to two points, lying outside the rotor discs and their connections to the shafts, where ball bearings of a smaller diameter can be provided to support the stator system. However, in the latter case, the length of the brake will be much too great in addition to the fact that the whole construction becomes very complicated.

Another disadvantage of the previously known structures lies in the fact that the distance of the bearings, supporting the shafts, is restricted by the width of the stator windings, while the bearings themselves are difficult to get at and very difficult to adjust. A breakdown of one of the bearings makes it necessary to dismantle the whole brake structure.

It is an object of the present invention to do away with these prior art disadvantages and to provide an improved eddy current brake, which excels in a very efficient use of the available space, made possible by its extremely compact construction, and which can therefore be used very advantageously in roller testing stands. The eddy current brake according to the invention is characterized in that the end of each shaft is supported in an oblong housing which comprises a radial bearing and, at a certain distance therefrom, a combination of tapered roller bearings, the two housings for the two shafts being arranged lengthwise, one after the other, in such a way that in the free space between the ends which are positioned adjacent each other, a pair of rotor discs are respectively connected to the ends of the respective shafts protruding from their housings. Furthermore, the other end of each shaft is rotatably supported in its housing and the latter is fixed to the center of a cruciform carrier, the spaced, corresponding ends of the carriers being interconnected by means of spacers and fastening bolts and one of the carriers supporting also the stator poles via axially directed supporting pieces.

These unique features which characterize the present invention make it possible to construct the improved eddy current brake in such a way that the dimensions, in radial as well as in axial direction, are as small as possible, while a very rigid and strong structure is obtained. There is, with regard to the distance of the individual shaft bearings, no restriction imposed by the dimensions of the stator windings. Another advantage is that the axial bearings, e.g. a double tapered roller bearing and the radial bearing, can be assembled on the shaft and adjusted before the shaft is assembled into the housing. The housing itself is capable of being easily fabricated. The lubrication of the bearings can be provided for by means of a grease nipple on the housings. By a suitable choice of the bearing seals, it is possible to provide for excess grease to escape to the outside of the housings, away from the rotor discs, so that they cannot reach these discs. This is an advantage with respect to the known constructions of the prior art where the bearings are lubricated through a centrally placed conduit and excess grease escapes near the rotor where, during operation, the vanes on the discs can carry it to the hot rotor discs. The whole structure, as well as the assembly, the dismantling and the servicing of the improved brake according to the present invention is thus very much better than the brakes of the prior art.

The invention is hereinafter explained in greater detail with reference to one preferred and illustrative embodiment shown in the accompanying drawings. In the drawings:

FIG. 1 is a longitudinal section of an illustrative embodiment according to the invention; and FIG. 2 shows to a slightly larger scale an end view of this embodiment.

The exemplary embodiment of eddy current brake illustrated in the drawing and intended to be used in roller testing stands is adapted for braking two coaxial shafts 1, 1', respectively, which can rotate independently of each other. Each of the shafts is rotatably supported by two tapered roller bearings 2, 3 and 2', 3', respectively, and a ball bearing 4, 4', respectively, in a cylindrical housing 5, 5', respectively. The bearings can be placed and adjusted on the ends of the shafts prior to the introduction of the shafts in the housings 5, 5'. It will be appreciated that this greatly facilitates the assembly of the brake. The two housings 5, 5', respectively, are accommodated in a cruciform yoke 6, 6', respectively. The two yokes are separated by the spacers 7a . . . 7n, which are secured against displacement by the aid of the nuts 9 screwed on the threaded ends 8. As illustrated in the drawing, the construction of the invention is such that the forces produced during operation of the brake, directed towards each other, and acting upon the coaxial shafts, are transmitted to the yokes 6, 6' via the housings 5, 5' and are absorbed by the spacers 7a . . . 7n, to result in a quite stiff and compact structure.

Each of the shafts carries at its end a flange 10, 10', respectively. These flanges are fixedly secured to their respective shafts by means of radially expansible conical ring systems 11, 11'. Each flange 10, 10', carries a ring of blower vanes 12, 12' which, in turn, carry the rotor discs 13, 3'. The blower vanes are perpendicular to the disc surface and are bent or curved in the manner of the vanes of a centrifugal blower so that they generate air currents that cool the discs. These two rotor discs are respectively positioned on either side of the stator poles 4a . . . 14h, which are arranged in a circle. Each stator pole carries an energizing winding 15a . . . 15h in a manner well understood in the art. Advantageously, the stator poles are supported by a carrier plate 16 which, via the fastening pieces 17, is supported by the yoke 6'.

The drawing illustrates an embodiment in which the frame consisting of the yokes 6, 6' and the housings 5, 5' is supported by two ball bearings 18, 18' accommodated in a fixed frame 19. Those skilled in the art will appreciate that the radial and axial dimensions of the inventive eddy current brake, even though the stator system is a rotatably supported one, are quite small. It will be appreciated that this is a great advantage since the available space in roller testing stands is very restricted.

The present invention may be embodied in forms other than those illustrated and described herein without departing from the spirit and principles thereof and, accordingly, reference should be made to the appended claims rather than to the foregoing specification as indicating the scope of the invention.

What is claimed as the invention is:

1. An improved eddy current brake for a roller testing stand comprising a unitary stator system having a number of stator poles, each carrying an electrically energized coil and arranged in a circular configuration, a plurality of rotor systems cooperating with the stator poles, said rotor systems being each coupled to a shaft and arranged such that a rotor is arranged on each side of the stator poles, said shafts being supported by bearings for taking up axially and radially directed forces, the spacing between the stator poles and the rotor being such that the magnetic flux generated by the stator system crosses both the rotors, the two rotors in the magnetic circuit constituting a magnetic series circuit, and means coupling each rotor to one of a pair of coaxial shafts.

2. An improved eddy current brake according to claim 1, wherein each coaxial shaft is supported by axial and radial bearings in a housing provided in the center of a cruciform carrier, the spaced corresponding ends of said cruciform carrier being interconnected by means of spacers and fastening means and one of the carrier ends carrying axially directed intermediate members for supporting said stator poles.

3. An improved eddy current brake according to claim 1, in which each of said rotors is secured to the edges of a number of curved blower vanes.

References Cited

UNITED STATES PATENTS

| | | | |
|---|---|---|---|
| 1,902,307 | 3/1933 | Larkin | 73—117 |
| 2,311,331 | 2/1943 | Ericson | 73—136 |
| 2,516,903 | 8/1950 | Oetzel | 310—93 |

DAVID X. SLINEY, Primary Examiner